(12) United States Patent
Bamba et al.

(10) Patent No.: US 10,984,252 B2
(45) Date of Patent: Apr. 20, 2021

(54) APPARATUS AND METHOD FOR ANALYZING PEOPLE FLOWS IN IMAGE

(71) Applicant: CANON KABUSHIKI KAISHA, Tokyo (JP)

(72) Inventors: Yasuo Bamba, Kawasaki (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 16/145,651

(22) Filed: Sep. 28, 2018

(65) Prior Publication Data

US 2019/0102630 A1 Apr. 4, 2019

(30) Foreign Application Priority Data

Oct. 2, 2017 (JP) .............................. JP2017-193026

(51) Int. Cl.
| | | |
|---|---|---|
| *G06K 9/00* | (2006.01) | |
| *G06T 7/246* | (2017.01) | |
| *G06K 9/62* | (2006.01) | |
| *G06T 11/60* | (2006.01) | |
| *G06T 11/20* | (2006.01) | |

(52) U.S. Cl.
CPC ....... *G06K 9/00778* (2013.01); *G06K 9/6218* (2013.01); *G06K 9/6284* (2013.01); *G06T 7/248* (2017.01); *G06T 11/206* (2013.01); *G06T 11/60* (2013.01); *G06T 2207/20084* (2013.01); *G06T 2207/30196* (2013.01); *G06T 2207/30232* (2013.01)

(58) Field of Classification Search
CPC ............. G06K 9/00778; G06K 9/6218; G06K 9/6284; G06T 11/206; G06T 11/60; G06T 7/248; G06T 2207/20084; G06T 2207/30196; G06T 2207/30232

USPC ........................................................ 382/103

See application file for complete search history.

(56) References Cited

U.S. PATENT DOCUMENTS

| | | | |
|---|---|---|---|
| 6,424,752 | B1 | 7/2002 | Katayama et al. |
| 6,549,681 | B1 | 4/2003 | Takiguchi et al. |
| 6,621,921 | B1 | 9/2003 | Matsugu et al. |

(Continued)

FOREIGN PATENT DOCUMENTS

| | | | |
|---|---|---|---|
| JP | 2016153571 | * | 8/2016 |
| JP | 2017-068598 A | | 4/2017 |
| JP | 2017068598 | * | 4/2017 |

OTHER PUBLICATIONS

Wang, "Anomaly detection in crowd scene," IEEE 10th international conference on signal processing proceedings, Beijing, 2010, pp. 1220-1223.*

(Continued)

*Primary Examiner* — Juan A Torres
(74) *Attorney, Agent, or Firm* — Venable LLP

(57) ABSTRACT

An image processing apparatus includes an acquisition unit configured to acquire a movement vector in a partial area of an image, the movement vector indicating a movement of people detected from the image, a generation unit configured to generate a cluster of movement in which a previously stored probability of occurrence of predetermined movement in the partial area is less than a predetermined threshold, based on a frequency of the acquired movement vector, and an output unit configured to output information indicating that the generated cluster is abnormal.

22 Claims, 18 Drawing Sheets

(56) References Cited

U.S. PATENT DOCUMENTS

| | | |
|---|---|---|
| 6,704,041 B2 | 3/2004 | Katayama et al. |
| 8,737,740 B2 | 5/2014 | Tojo et al. |
| 9,418,440 B2 | 8/2016 | Sagawa et al. |
| 2020/0050872 A1* | 2/2020 | Ikeda ................... G06K 9/6218 |

OTHER PUBLICATIONS

Guo, "A novel statistical learning-based framework for automatic anomaly detection and localization in crowds," 2013 IEEE International Conference on Robotics and Biomimetics (ROBIO), Shenzhen, 2013, pp. 1211-1215.*

Li, "Anomaly detection techniques in surveillance videos," 2016 9th International Congress on Image and Signal Processing, BioMedical Engineering and Informatics (CISP-BMEI), Datong, 2016, pp. 54-59.*

Lu, "Crowd behavior understanding through SIOF feature analysis," 2017 23rd International Conference on Automation and Computing (ICAC), Huddersfield, Sep. 7, 2017, pp. 1-6.*

Silveira, "Crowd Analysis Using Computer Vision Techniques," in IEEE Signal Processing Magazine, vol. 27, No. 5, pp. 66-77, Sep. 2010.*

Chebi, "Dynamic detection of anomalies in crowd's behavior analysis," 2015 4th International Conference on Electrical Engineering (ICEE), Boumerdes, 2015, pp. 1-5.*

Wen, "Abnormal event detection based on social force model combined with crowd violent flow," 2016 4th International Conference on Cloud Computing and Intelligence Systems (CCIS), Beijing, 2016, pp. 440-446.*

Wang, "Detection of Abnormal Visual Events via Global Optical Flow Orientation Histogram," in IEEE Transactions on Information Forensics and Security, vol. 9, No. 6, pp. 988-998, Jun. 2014.*

Lee, "Crowd Behavior Representation Using Motion Influence Matrix for Anomaly Detection," 2013 2nd IAPR Asian Conference on Pattern Recognition, Naha, 2013, pp. 110-114.*

Elad Walach, et al., "Learning to Count with CNN Boosting," Computer Vision—ECCV, Lecture Notes in Computer Vision, vol. 9906, 2016, pp. 1-18.

* cited by examiner

TIME $t_1$

TIME $t_2$

LINES OF FLOW

FIG. 7

PEOPLE DENSITY DISTRIBUTION

|   |   | 0.1 | 0.6 |
|---|---|-----|-----|
|   |   |     | 0.1 |
| 0.9 | 0.5 |   |   |
| 0.6 | 0.7 |   |   |

MOVEMENT VECTORS (HORIZONTAL)

|   |   | 1.3 | 2.1 |
|---|---|-----|-----|
|   |   |     | 1.1 |
| 0.0 | -0.2 |   |   |
| -0.1 | -0.2 |   |   |

MOVEMENT VECTORS (VERTICAL)

|   |   | -0.1 | 0.2 |
|---|---|------|-----|
|   |   |      | 0.0 |
| 0.2 | 0.8 |   |   |
| 0.3 | 0.6 |   |   |

MOVEMENT VECTORS

→ WEIGHT 0.6
→ WEIGHT 0.1

FIG. 10

6 A.M. - 9 A.M. ON WEEKDAYS

|  | [0 DEGREES, 30 DEGREES) | [30 DEGREES, 60 DEGREES) | ... | [330 DEGREES, 360 DEGREES) | STAGNANT | RANDOM |
|---|---|---|---|---|---|---|
| PARTIAL IMAGE 1 | 45% | 12% |  |  | 2% | 5% |
| PARTIAL IMAGE 2 | 5% | 22% |  |  | 40% | 10% |

⋮

9 A.M. - 12 A.M. ON WEEKDAYS

|  | [0 DEGREES, 30 DEGREES) | [30 DEGREES, 60 DEGREES) | ... | [330 DEGREES, 360 DEGREES) | STAGNANT | RANDOM |
|---|---|---|---|---|---|---|
| PARTIAL IMAGE 1 | 20% | 4% |  |  | 25% | 0% |
| PARTIAL IMAGE 2 | 4% | 5% |  |  | 10% | 1% |

⋮

DIRECTED PEOPLE-FLOW CLUSTER

STAGNANT CLUSTER

RANDOM CLUSTER

APPARATUS AND METHOD FOR ANALYZING PEOPLE FLOWS IN IMAGE

CROSS-REFERENCE TO RELATED APPLICATIONS

This application claims the benefit of Japanese Patent Application No. 2017-193026, filed Oct. 2, 2017, which is hereby incorporated by reference herein in its entirety.

BACKGROUND OF THE INVENTION

Field of the Invention

The present invention relates to an apparatus for and a method of analyzing flows of people in an image.

Description of the Related Art

In recent years, systems have been proposed that shoot an image of a predetermined area with an imaging apparatus and analyze the shot image, thereby analyzing flows of people in the image. Analyzing the flows of people enables immediate detection of, e.g., the occurrence of a flow of people flowing in a direction different from the direction of usual flows of people, or the occurrence of a small group moving against the flow of a large crowd. It is anticipated that utilizing such systems will prevent unexpected accidents in places such as public areas and large commercial facilities.

Japanese Patent Application Laid-Open No. 2017-68598 discloses a technique of analyzing flows of people of a crowd that is so dense that people are in contact with each other, and detecting the occurrence of an abnormal movement in the crowd. The technique of Japanese Patent Application Laid-Open No. 2017-68598 involves dividing a time-series image into time-space segments, calculating a motion feature amount for each time-space segment, and classifying each time-space segment as either a normal segment or an abnormal segment.

The time-space segments, however, do not necessarily correspond to respective people constituting the crowd. This poses a problem in that, although an abnormal people-flow can be detected, information such as how many people constitute the abnormal people-flow cannot be obtained.

SUMMARY OF THE INVENTION

According to an aspect of the present invention, an image processing apparatus includes an acquisition unit that acquires movement vectors of a crowd for each area of an image, a generation unit that generates people-flow clusters based on the movement vectors acquired by the acquisition unit, a classification unit that classifies the people-flow clusters generated by the generation unit into normal people-flow clusters and abnormal people-flow clusters, and a display unit that displays, in a visually distinguishable manner, the normal people-flow clusters and the abnormal people-flow clusters as superimposed on the image.

Further features of the present invention will become apparent from the following description of exemplary embodiments with reference to the attached drawings.

BRIEF DESCRIPTION OF THE DRAWINGS

FIG. 7 is a diagram illustrating an exemplary people density distribution and exemplary movement vectors.

FIG. 10 is a diagram illustrating exemplary probabilities of occurrence of people-flow clusters learned by a people-flow learning unit.

DESCRIPTION OF THE EMBODIMENTS

Preferred embodiments of the present invention will now be described in detail in accordance with the accompanying drawings.

First Embodiment

Figure 1:
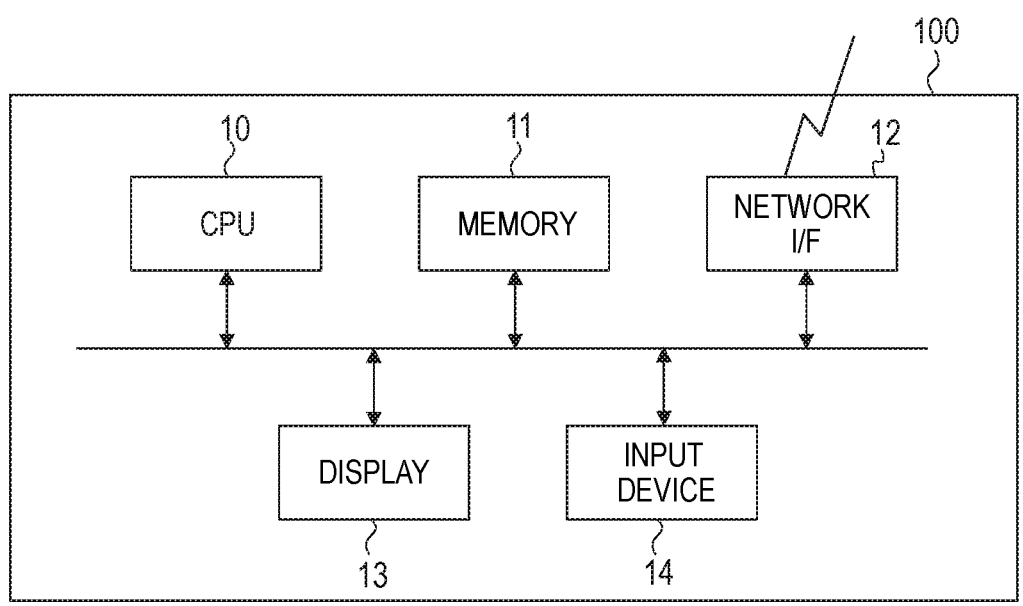
FIG. 1 is a diagram illustrating an exemplary hardware configuration of an image processing apparatus.

FIG. 1 is a diagram illustrating an exemplary hardware configuration of an image processing apparatus 100.

As the hardware configuration, the image processing apparatus 100 includes a CPU 10, a memory 11, a network I/F 12, a display 13, and an input device 14. The CPU 10 is responsible for overall control of the image processing apparatus 100. The memory 11 stores data and programs used by the CPU 10 for processing. The input device 14, which may be a mouse or buttons, inputs user operations to the image processing apparatus 100. The display 13, which may be a liquid crystal display, displays results of processing performed by the CPU 10. The network I/F 12 is an interface that connects the image processing apparatus 100 to a network. By the CPU 10 performing processing based on programs stored in the memory 11, the functional configuration of the image processing apparatus 100 in FIG. 2 (to be described below) and the process of a flowchart in FIG. 3 (to be described below) are implemented.

Figure 2:
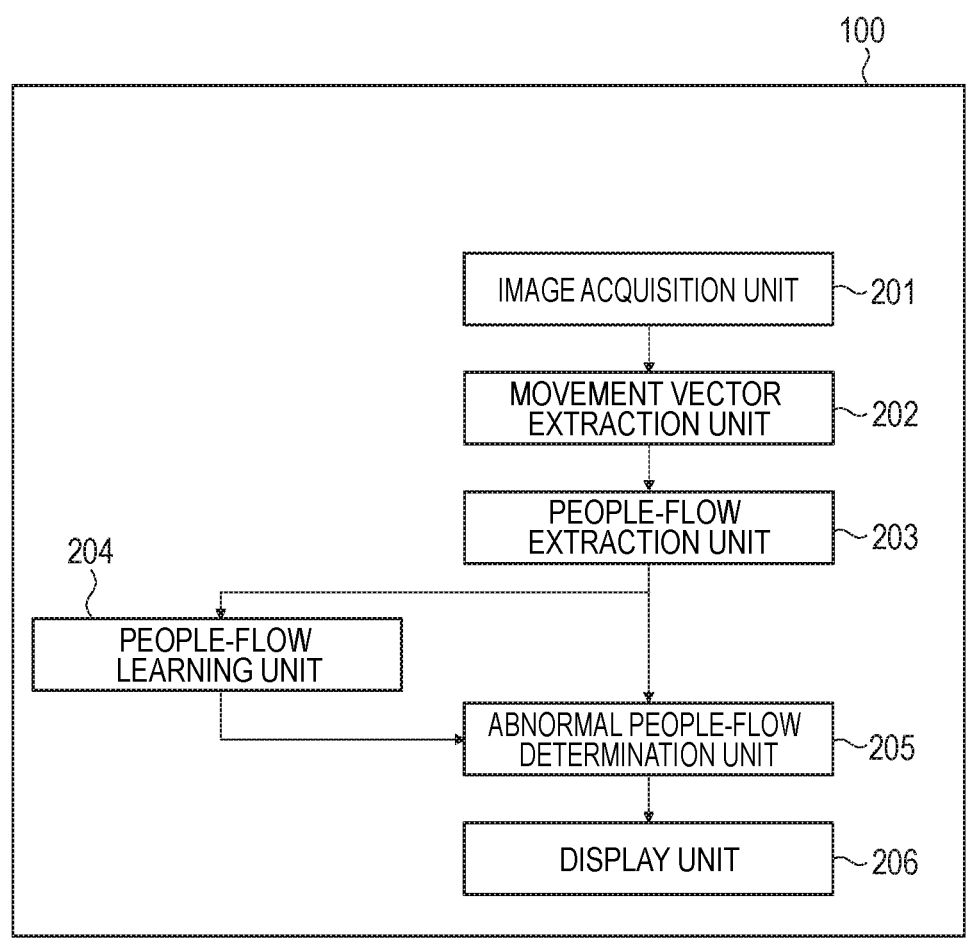
FIG. 2 is a diagram illustrating an exemplary functional configuration of the image processing apparatus.

FIG. 2 is a diagram illustrating an exemplary functional configuration of the image processing apparatus 100.

As the functional configuration, the image processing apparatus 100 includes an image acquisition unit 201, a movement vector extraction unit 202, a people-flow extraction unit 203, a people-flow learning unit 204, an abnormal people-flow determination unit 205, and a display unit 206.

The image acquisition unit 201 acquires an input image to be subjected to people-flow analysis.

The movement vector extraction unit 202 divides the image acquired by the image acquisition unit 201 into partial images. The movement vector extraction unit 202 then performs video analysis to acquire movement vectors for each partial image. Here, a movement vector is information indicating from which position to which position the head of an individual in a crowd moved in a predetermined momentary period (e.g., ⅕ second).

The people-flow extraction unit 203 receives the movement vectors estimated for each partial image by the movement vector extraction unit 202. The people-flow extraction unit 203 then clusters the movement vectors for each partial image to divide the movement vectors into a number of clusters, thereby obtaining people-flow clusters.

The people-flow learning unit 204 collects, over a certain learning period, the people-flow clusters obtained by the people-flow extraction unit 203. The people-flow learning unit 204 then statistically obtains the probabilities of occurrence of the people-flow clusters from the collected people-flow clusters. As a result of the people-flow learning unit 204 statistically obtaining the probabilities of occurrence of the people-flow clusters, it is found that, for example, around ticket gates in a station, people-flow clusters moving in directions orthogonal to the line of ticket gates are likely to occur. Since the directions of normal people-flows may vary with day of week or time of day, the people-flow learning unit 204 may obtain the probabilities of occurrence of the people-flow clusters for each day of week or each time of day. The people-flow learning unit 204 may also constantly obtain the probabilities of occurrence of the people-flow clusters over the last predetermined period (e.g., fifteen minutes).

The abnormal people-flow determination unit 205 determines whether each of the people-flow clusters provided by the people-flow learning unit 204 is normal or abnormal. Alternatively, the abnormal people-flow determination unit 205 outputs the probability of being abnormal, i.e., the degree of abnormality, for each people-flow cluster.

The display unit 206 displays the people-flow clusters obtained by the people-flow extraction unit 203 on the display 13. In doing so, the display unit 206 displays, in a visually distinguishable manner, the normal people-flow clusters and the abnormal people-flow clusters determined by the abnormal people-flow determination unit 205.

Figure 3:
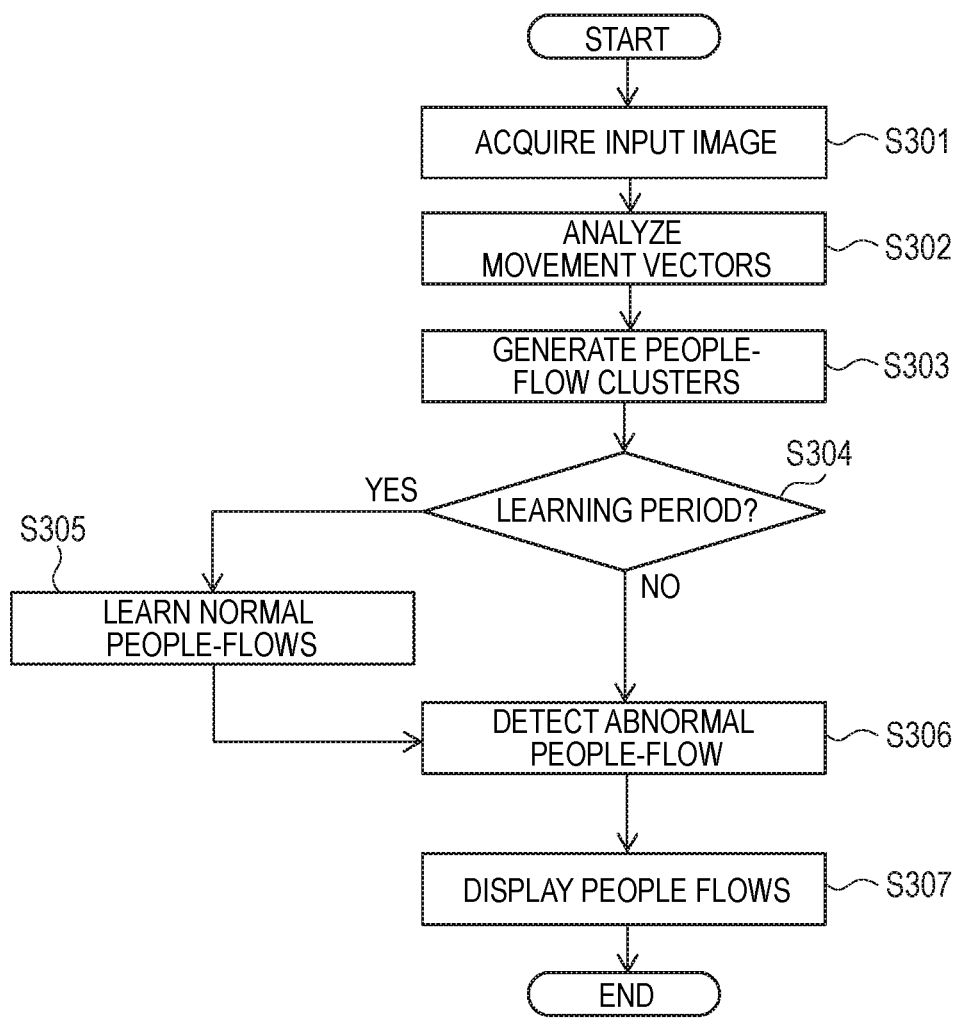
FIG. 3 is a flowchart illustrating exemplary information processing by the image processing apparatus.

FIG. 3 is a flowchart illustrating exemplary information processing by the image processing apparatus 100.

At step S301, the image acquisition unit 201 acquires an input image to be subjected to people-flow analysis. The image acquisition unit 201 may acquire the image from a solid state imaging sensor, such as a CMOS sensor or CCD sensor, or from a storage device such as a hard disk.

Figure 4:
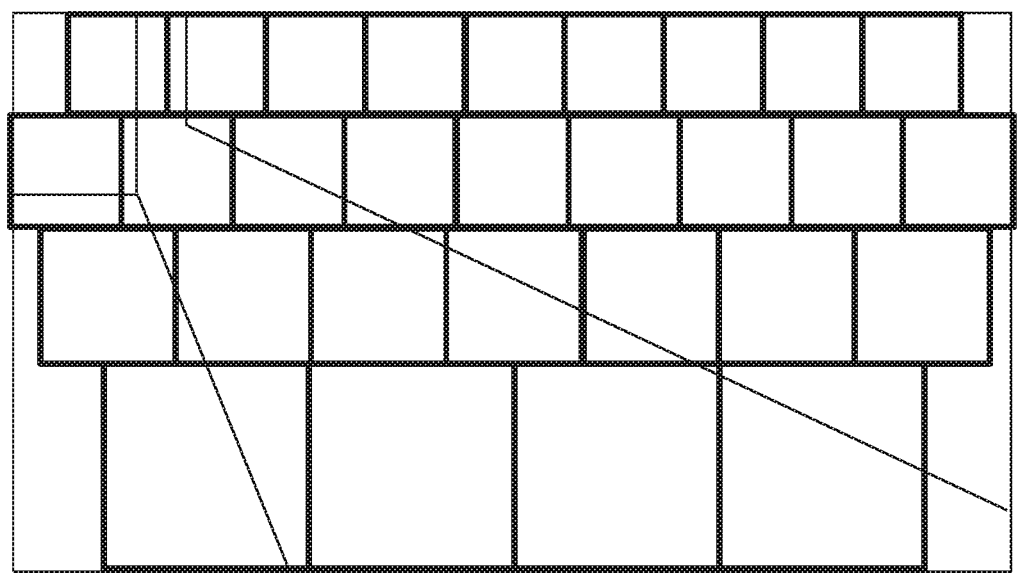
FIG. 4 is a diagram illustrating a way of dividing a screen into partial images.

At step S302, the movement vector extraction unit 202 divides the image acquired by the image acquisition unit 201 into partial images. FIG. 4 is a diagram illustrating a way of dividing a screen into partial images. FIG. 4 illustrates an example in which the movement vector extraction unit 202 divides the image so that the ratio between the size of each partial image and the size of human bodies shown in the partial image is substantially constant. The movement vector extraction unit 202 then performs video analysis to extract movement vectors for each partial image. The processing in step S302 is an example of processing of acquiring movement vectors of a crowd for each area in the image. Various ways may be used to acquire the movement vectors.

A first way of acquiring the movement vectors is combination of human body detection and human body tracking.

Human body detection is processing of identifying the position of a predetermined body part in an image, such as the whole or part of the face or body, and is implemented using various known techniques of pattern recognition or machine learning. Human body tracking is processing of matching human bodies resulting from human body detection performed for each of a pair of temporally sequential image frames. The matching processing can be formulated as a matching problem in which, among human body detection results, those corresponding to the same person in respective image frames are paired. First, the movement vector extraction unit 202 defines the degrees of similarity between the human body detection results using any values, such as the position and size of a figure representing each human body and the feature amounts extracted from the image. The movement vector extraction unit 202 can then determine the matching between the human body detection results using a method of sequentially paring the human body detection results in descending order of degree of similarity, or using the total optimization method in which the human body detection results are paired to maximize the sum of overall degrees of similarity. The movement vector extraction unit 202 assigns the same ID to each pair of matched human body detection results, which is presented as a human body tracking result.

Figure 5A:
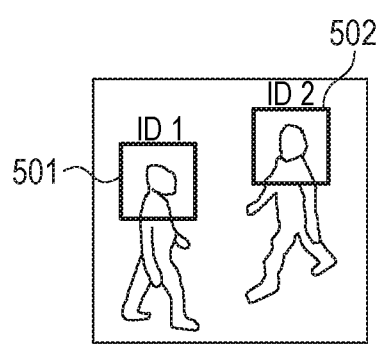
FIG. 5A, FIG. 5B, and FIG. 5C are diagrams illustrating exemplary matching.
Figure 5B:
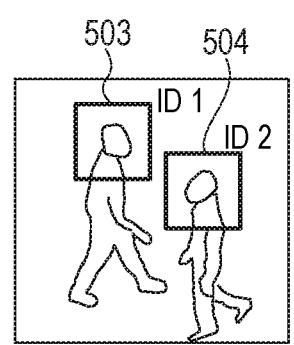
Figure 5C:
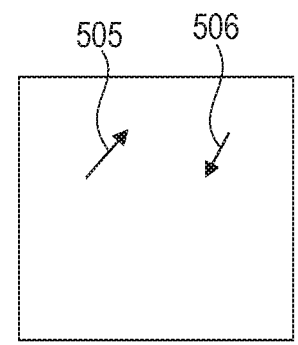

FIGS. 5A to 5C are diagrams illustrating exemplary matching. FIG. 5A is the result of performing human body detection in an image frame acquired at time t1. FIG. 5B is the result of performing human body detection in an image frame acquired at time t2 after the lapse of a predetermined momentary period (e.g., ⅕ second) from time t1. Rectangles 501, 502, 503, and 504 correspond to detected human bodies. By performing human body tracking, the rectangles 501 and 503 are assigned an ID 1, and the rectangles 502 and 504 are assigned an ID 2. Connecting the positions before and after the movement of the rectangles with the same ID yields a movement vector. In the case of FIGS. 5A to 5C, an arrow 505 connecting the center of the rectangle 501 as the start point and the center of the rectangle 503 as the end point is a movement vector. Similarly, an arrow 506 connecting the center of the rectangle 502 as the start point and the center of the rectangle 504 as the end point is a movement vector.

Figure 6:
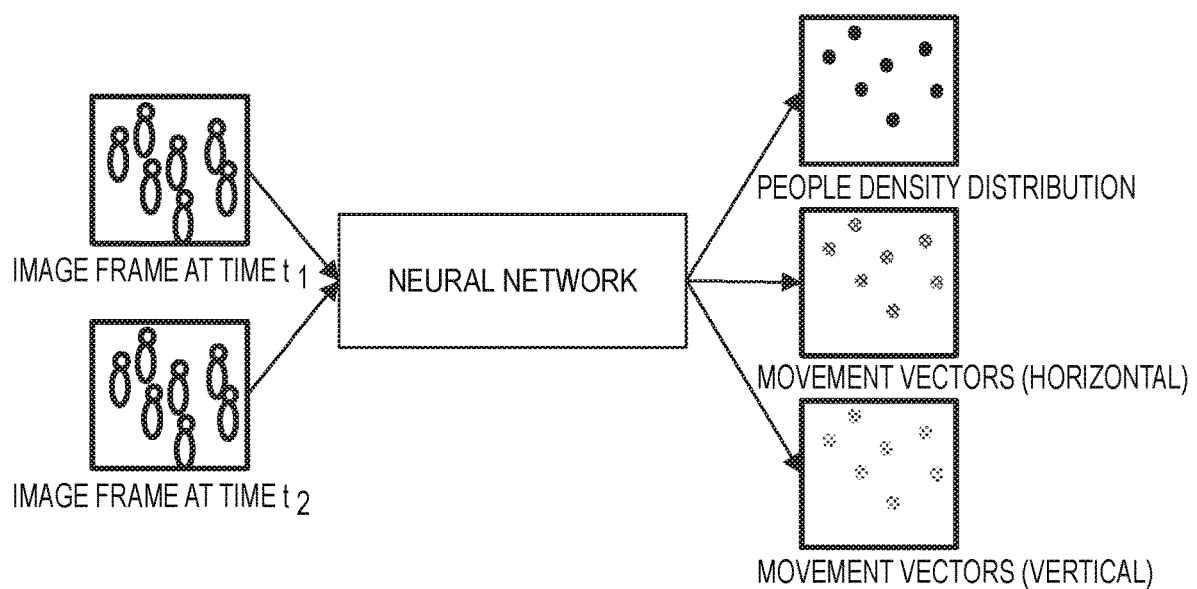
FIG. 6 is a diagram illustrating an exemplary function of a movement vector extraction unit.

A second way of acquiring the movement vectors is to use an estimator that takes temporally sequential image frames of a partial image as an input and estimates a crowd density distribution and movement vector distributions. As a way of estimating a people density distribution and movement vector distributions in an image, a method described in a document "Walach E., Wolf L. (2016) Learning to Count with CNN Boosting. In: Leibe B., Matas J., Sebe N., Welling M. (eds) Computer Vision—ECCV 2016. ECCV 2016. Lecture Notes in Computer Science, vol 9906. Springer, Cham" may be used, for example. In this document, a neural network obtained in advance by machine learning is used to determine a people density distribution from an image. The present embodiment applies this method. A neural network is learned in advance that takes two sequential frames of a partial-image as an input to simultaneously estimate a people density distribution and movement vector distributions in the partial image, and the neural network is used for estimation. FIG. 6 is a diagram illustrating an exemplary function of the movement vector extraction unit 202. In the output from a neural network in FIG. 6, dark-colored parts in a people density distribution represent the positions of the heads of people. In movement vectors, darker-colored values represent greater amounts of movement. Since the crowd moves in the right-left direction in the example of FIG. 6, the horizontal movement vectors have greater values while the vertical movement vectors have smaller values. The density distribution is designed in such a manner that the sum of the values of the density distribution in an area substantially equals the number of people in that area.

FIG. 7 is a diagram illustrating an exemplary people density distribution and exemplary movement vectors in a partial image, estimated by an estimator. The movement vector extraction unit 202 can extract the movement vectors by synthesizing horizontal movement vectors and vertical movement vectors. The movement vectors have weights equal to the values of the density distribution. In the example of FIG. 7, seven weighted movement vectors are obtained in the partial image.

The two ways of acquiring the movement vectors have thus been described. For highly accurate extraction of the movement vectors, the first way may be used for a lightly congested crowd, and the second way may be used for a heavily congested crowd. Acquisition of the movement vectors is not limited to these ways but may employ any ways.

At step S303, the people-flow extraction unit 203 receives the movement vectors estimated for each partial image by the movement vector extraction unit 202. The people-flow extraction unit 203 then clusters the movement vectors for each partial image to divide the movement vectors into a number of clusters, thereby obtaining people-flow clusters.

Figure 8:
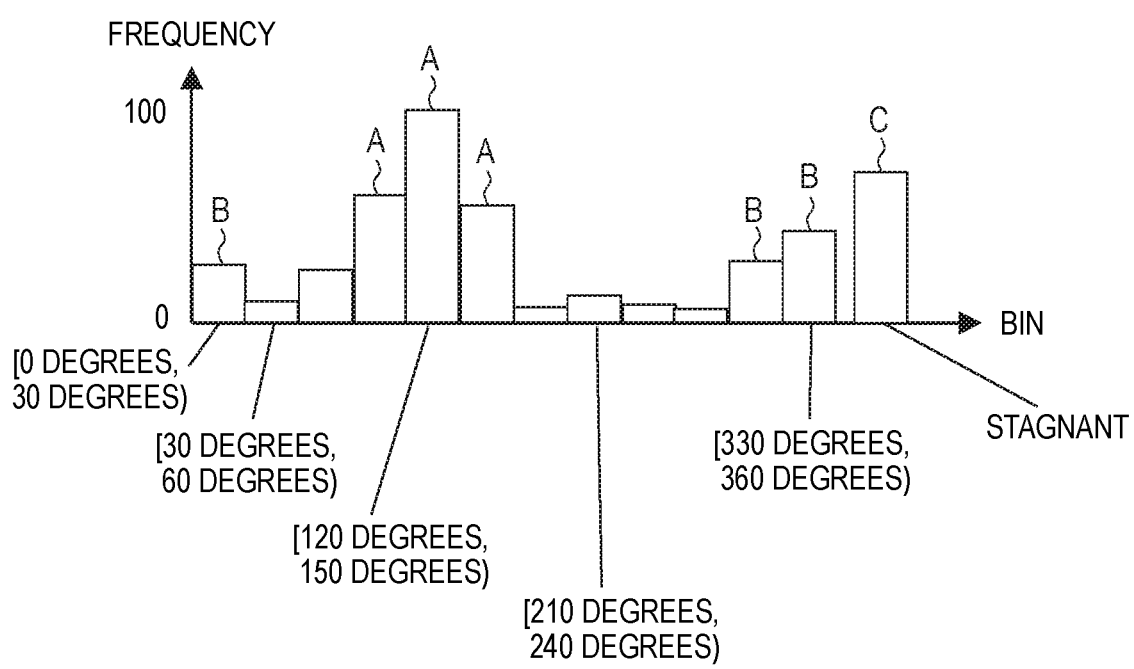
FIG. 8 is a diagram illustrating an exemplary histogram divided into bins.

The movement vectors may be clustered in any way. A way involving use of a histogram will be described below. First, from movement vectors longer than a predetermined threshold among the movement vectors acquired by the movement vector extraction unit 202, the people-flow extraction unit 203 generates a histogram based on the directions of the movement vectors. Here, if the movement vectors are weighted, the people-flow extraction unit 203 takes the weights into account to count the frequencies. FIG. 8 is a diagram illustrating an exemplary histogram divided into bins of a width of 30 degrees.

Then, in this histogram, bins having a relative maximum value, i.e., bins having a frequency higher than both the frequencies of the two adjacent bins, are looked for. Here, because of the cyclicity of angles, the bin of "0 to below 30 degrees" and the bin of "330 to below 360 degrees" are regarded as adjacent. In the example of FIG. 8, the bins of "120 to below 150 degrees," "210 to below 240 degrees" and "330 to below 360 degrees" have a relative maximum value.

Then, from the bins having a relative maximum value, the people-flow extraction unit 203 excludes insignificant bins. For example, the people-flow extraction unit 203 regards bins having a frequency below a threshold as insignificant bins and excludes these bins. If the threshold is fifteen, in the example of FIG. 8, the bin of "210 to below 240 degrees" is excluded to leave the other two bins. Exclusion of bins is not limited to this way. For example, the people-flow extraction unit 203 may employ a way of excluding a bin based on whether or not "the frequency of the bin divided by the sum of the frequencies of all bins" is not greater than a threshold. The bins remaining after this processing will be called relative-maximum bins. The people-flow extraction unit 203 then generates people-flow clusters corresponding to the respective relative-maximum bins. The people-flow extraction unit 203 generates a people-flow cluster from a set of movement vectors belonging to the corresponding relative-maximum bin or to bins surrounding the corresponding relative-maximum bin. There are several ways of defining the range of bins to be regarded as the surrounding bins. A first way is to define up to N bins on each side of a relative-maximum bin as the surrounding bins (N is an integer not smaller than zero). For example, in FIG. 8, if up to one bin on each side are defined as the surrounding bins, a set of movement vectors belonging to three bins labeled "A" is a first people-flow cluster, and a set of movement vectors belonging to three bins labeled "B" is a second people-flow cluster. A second way is to define, among bins around a relative maximum bin, up to bins having a frequency greater than "the frequency of the relative-maximum bin multiplied by a predetermined factor" are defined as the surrounding bins.

The people-flow extraction unit 203 then calculates, for each people-flow cluster, statistical values such as the number of constituent people, speed, and direction. The number of constituent people is obtained from the number of movement vectors constituting the people-flow cluster. The speed is determined by calculating the average or median of the magnitudes of the movement vectors constituting the people-flow cluster. The direction is also determined, as with the speed, by calculating the average or median of the directions of the movement vectors constituting the people-flow cluster. This processing yields a directed people-flow cluster. This processing of generating the directed people-flow cluster is an example of processing of generating, according to the movement vectors, a directed people-flow cluster from a crowd moving in the same direction.

For the directed people-flow clusters, the people-flow extraction unit 203 may set the maximum value per area. For example, the people-flow extraction unit 203 may output only up to two directed people-flow clusters per area. In that case, the people-flow extraction unit 203 takes people-flow clusters in descending order of number of constituent people. This processing of generating the directed people-flow cluster is also an example of processing of generating, according to the movement vectors, a directed people-flow cluster from a crowd moving in the same direction.

Clustering of the flows of people is not limited to the above ways. For example, the people-flow extraction unit 203 may use known cluster analysis techniques, such as the k-means method and hierarchical techniques.

Figure 9:
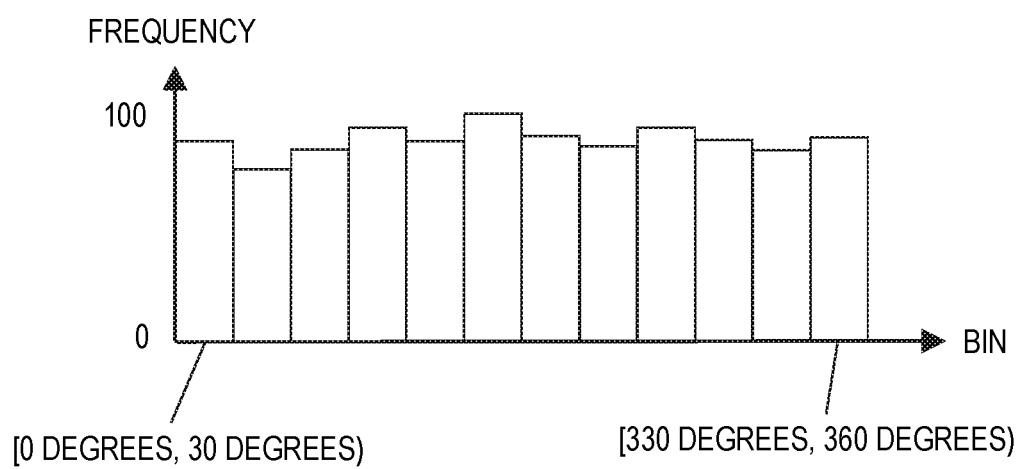
FIG. 9 is a diagram illustrating an exemplary histogram divided into bins.

Movement vectors shorter than a predetermined threshold, i.e., movement vectors corresponding to substantially unmoving heads, are classified into a special bin called "stagnant." If the frequency of a stagnant bin is not lower than a threshold, the people-flow extraction unit 203 also regards the stagnant bin as an independent people-flow cluster. If the threshold is fifteen, in the example of FIG. 8, a set of movement vectors belonging to a stagnant bin is a third people-flow cluster because the frequency of the stagnant bin is not lower than the threshold. Hereafter, the people-flow cluster generated in this manner will be called a stagnant cluster. This processing of generating the stagnant cluster is an example of generating, according to the movement vectors, a stagnant cluster from a crowd stagnating at the same location. Now, the case when flows of people are hard to be clustered will be described. If individuals in a crowd randomly move around with no tendency in the directions of movement vectors, the movement vectors appear substantially uniformly in all directions as in FIG. 9.

As in this case, if the frequencies of movement vectors in all bins have a low distribution, the people-flow extraction unit 203 generates one special people-flow cluster called "random." Hereafter, the people-flow cluster generated in this manner will be called a random cluster. This processing of generating the random cluster is an example of generating, according to the movement vectors, a random cluster from a crowd moving in random directions.

At step S304, the people-flow extraction unit 203 determines whether it is currently a learning period or not. The learning period may be a fixed period, e.g., the first one week in every month, or may be explicitly defined by a user. If it is necessary to constantly calculate the probabilities of occurrence of the people-flow clusters over the last fifteen minutes, it is always the learning period. If it is determined that it is currently the learning period, the people-flow extraction unit 203 proceeds to step S305. Otherwise, the people-flow extraction unit 203 proceeds to step S306. At step S305, over the learning period, the people-flow learning unit 204 collects the people-flow clusters obtained by the people-flow extraction unit 203. The people-flow learning unit 204 then statistically obtains the probabilities of occurrence of the people-flow clusters from the collected people-flow clusters.

FIG. 10 is a diagram illustrating exemplary probabilities of occurrence of the people-flow clusters learned by the people-flow learning unit 204. In the example of FIG. 10, the people-flow learning unit 204 learns the probabilities of occurrence of the people-flow clusters for every three hours. In the example of FIG. 10, it can be seen that, between 6 a.m. and 9 a.m. on weekdays, people-flow clusters having directions of 0 to below 30 degrees occurred at a ratio of 45% in a partial image 1.

The people-flow learning unit 204 may also statistically obtain the probabilities of occurrence of the people-flow clusters over the last predetermined period. For example, the people-flow learning unit 204 may constantly calculate the probabilities of occurrence of the people-flow clusters over the last fifteen minutes.

At step S306, the abnormal people-flow determination unit 205 determines whether each of the people-flow clusters provided by the people-flow learning unit 204 is normal or abnormal. Based on the probabilities of occurrence of the people-flow clusters learned by the people-flow learning unit 204, the abnormal people-flow determination unit 205 determines the occurrence of a flow of people with a low probability of occurrence as abnormal. In the following, the threshold for determining as abnormal is assumed to be 10%. For example, if a people-flow cluster moving in a direction of fifteen degrees occurs in the partial image 1 at 8 a.m. on a weekday, this people-flow cluster is determined as normal because the probability of occurrence of this people-flow cluster is 45% according to FIG. 10. If a people-flow cluster moving in a direction of fifteen degrees occurs in a partial image 2 at the same hour, this people-flow cluster is determined as abnormal because the probability of occurrence of this people-flow cluster is 5% according to FIG. 10.

Instead of the binary classification of the people-flow cluster as normal or abnormal, the abnormal people-flow determination unit 205 may output the probability that each people-flow cluster will be abnormal, i.e., the degree of abnormality. This processing is an example of abnormality degree acquisition processing in which the abnormal people-flow determination unit 205 acquires the degree of abnormality of each people-flow cluster. For example, on the occurrence of a people-flow cluster with a probability of occurrence x, the abnormal people-flow determination unit 205 may return 1-x as the degree of abnormality of this people-flow cluster.

The abnormal people-flow determination unit 205 may also determine whether a people-flow cluster in a partial image of interest is normal or abnormal without using the probabilities of occurrence of the people-flow clusters learned by the people-flow learning unit 204. For example, in an environment in which a crowd is expected to move in one direction, the abnormal people-flow determination unit 205 can determine that the occurrence of multiple directed people-flow clusters in a small area is abnormal. Alternatively, the abnormal people-flow determination unit 205 may determine whether a people-flow cluster in a partial image of interest is normal or abnormal using people-flow clusters occurring in partial images around the partial image of interest. For example, if a directed people-flow cluster occurring in a partial image of interest has a direction different from any of people-flow clusters occurring in partial images around the partial image of interest, the abnormal people-flow determination unit 205 determines the people-flow cluster as abnormal.

The abnormal people-flow determination unit 205 may also determine whether a people-flow cluster in a partial image of interest is normal or abnormal using both the probabilities of occurrence of the people-flow clusters learned by the people-flow learning unit 204 and people-flow clusters occurring in partial images around the partial image of interest.

Figure 11A:
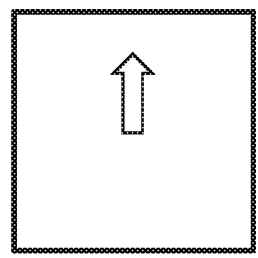
FIG. 11A, FIG. 11B, and FIG. 11C are diagrams illustrating exemplary icons corresponding to people-flow clusters.
Figure 11B:
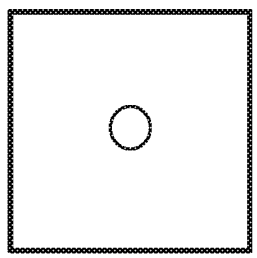
Figure 11C:
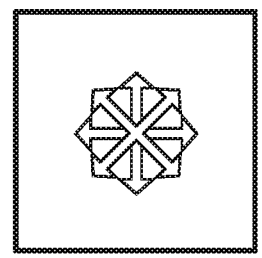

At step S307, the display unit 206 displays the people-flow clusters obtained by the people-flow extraction unit 203. FIGS. 11A to 11C are diagrams illustrating exemplary icons corresponding to people-flow clusters. An icon in FIG. 11A denotes a directed people-flow cluster. The direction of the arrow represents the direction of the flow of people. The display unit 206 may further have the number of people constituting the flow of people represented by the width of the arrow, and the speed of the flow of people represented by the length of the arrow. The display unit 206 may display the number of people constituting the flow of people as a number superimposed near the arrow. An icon in FIG. 11B denotes a stagnant cluster. The display unit 206 may have the number of people constituting the stagnant cluster and the average stagnation time represented by the radius and color of the circle. An icon in FIG. 11C denotes a random cluster. The display unit 206 may have the number of people constituting the random cluster and the degree of randomness represented by the radius and color of the icon. Correspondence between people-flow clusters and icons are not limited to these ways, but may employ many ways.

The display unit 206 displays, in a visually distinguishable manner, the normal people-flow clusters and the abnormal people-flow clusters determined by the abnormal people-flow determination unit 205. More specifically, the display unit 206 displays the people-flow clusters so that the normal ones and the abnormal ones are differentiated based on the color, width, transparency, color saturation, thickness of the outline, etc., of the icons. Alternatively, the display unit 206 differentiates between the normal people-flow clusters and the abnormal people-flow clusters by shading certain icons. The display unit 206 may also indicate the abnormal people-flows with text near the icons. The display unit 206 may also apply a visually distinguishable effect to the entire areas of partial images containing the occurrence of the abnormal people-flows. Here, an icon refers to an image representing a certain meaning with text or graphics.

Figure 12:
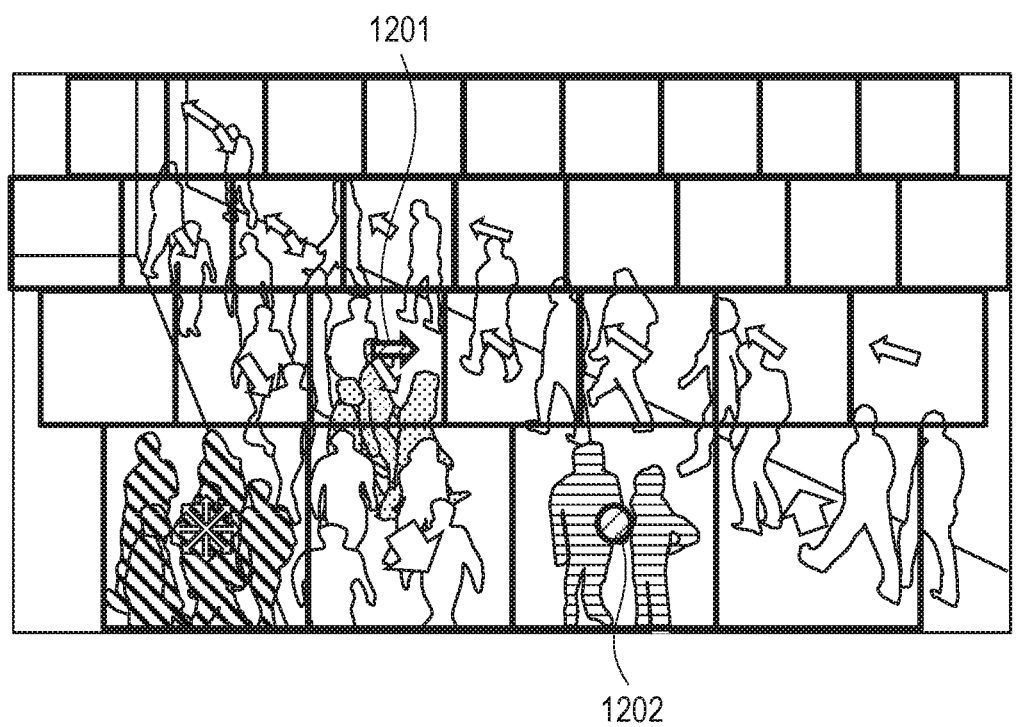
FIG. 12 is a diagram illustrating exemplary display by a display unit.

FIG. 12 is a diagram illustrating an exemplary display by the display unit 206. The display unit 206 superimposes, on each partial image, an icon corresponding to the type of a people-flow cluster obtained for the partial image. If there are multiple people-flow clusters in a partial image, the display unit 206 superimposes multiple icons on the partial image.

An icon 1201 in FIG. 12 represents a people-flow cluster moving rightward, determined to be abnormal by the abnormal people-flow determination unit 205. This people-flow cluster corresponds to a flow of people moving from the left toward the right on the screen to cross a flow of people appearing from the back toward the front on the screen. An icon 1202 in FIG. 12 represents a stagnant cluster determined to be abnormal by the abnormal people-flow determination unit 205. This stagnant cluster corresponds to stagnation occurring in a location usually having a low probability of occurrence of stagnation.

If the abnormal people-flow determination unit 205 is to output the degrees of abnormality of the people-flow clusters, the display unit 206 may display the flows of people in a visually distinguishable manner according to their probabilities. For example, for higher degrees of abnormality of the people-flow clusters, the display unit 206 may display the icons with higher color saturation.

Second Embodiment

This embodiment describes a case when flows of people superimposed on a map are displayed. In this embodiment, differences from the first embodiment will be described. Otherwise, the description will be omitted. By the CPU 10 performing processing based on programs stored in the memory 11, the functional configuration of an image processing apparatus 1300 in FIG. 13 (to be described below) and the process of a flowchart in FIG. 14 (to be described below) are implemented.

Figure 13:
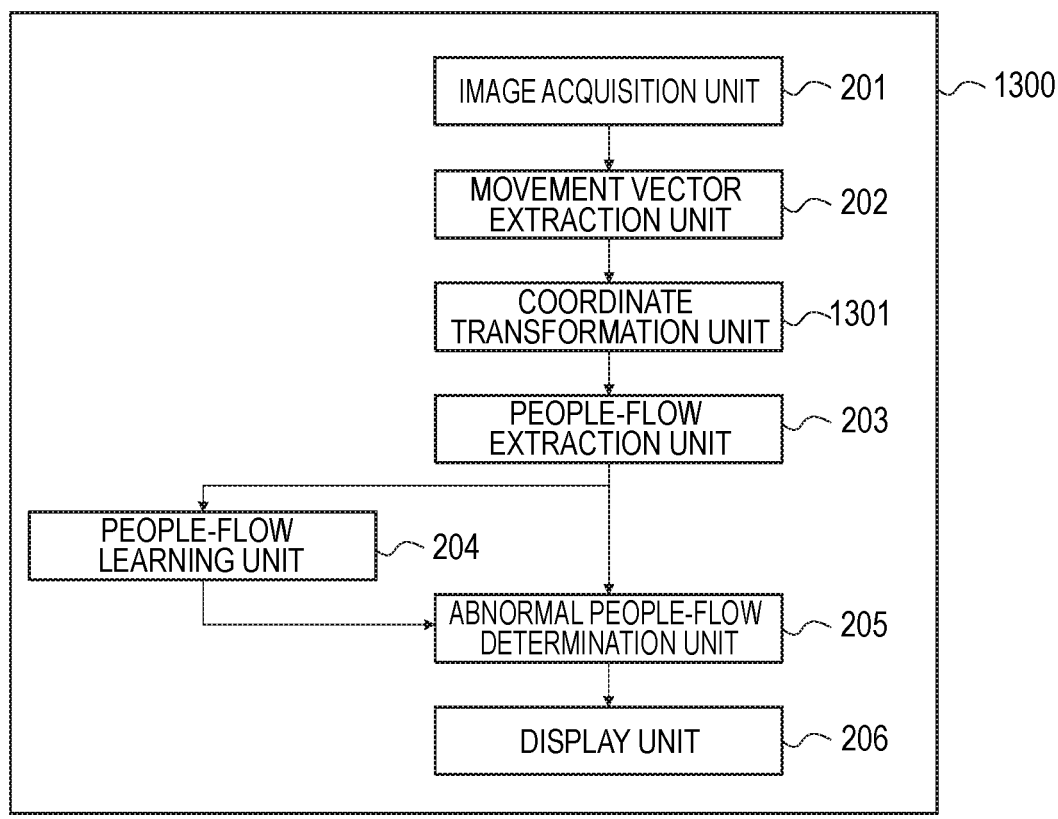
FIG. 13 is a diagram illustrating an exemplary functional configuration of an image processing apparatus.

FIG. 13 is a diagram illustrating an exemplary functional configuration of the image processing apparatus 1300. The image processing apparatus 1300 in FIG. 13 has a coordinate transformation unit 1301 further added to the image processing apparatus 100 in FIG. 2. The coordinate transformation unit 1301 performs processing of transforming detected coordinates in a camera image into detected coordinates on a map.

Figure 14:
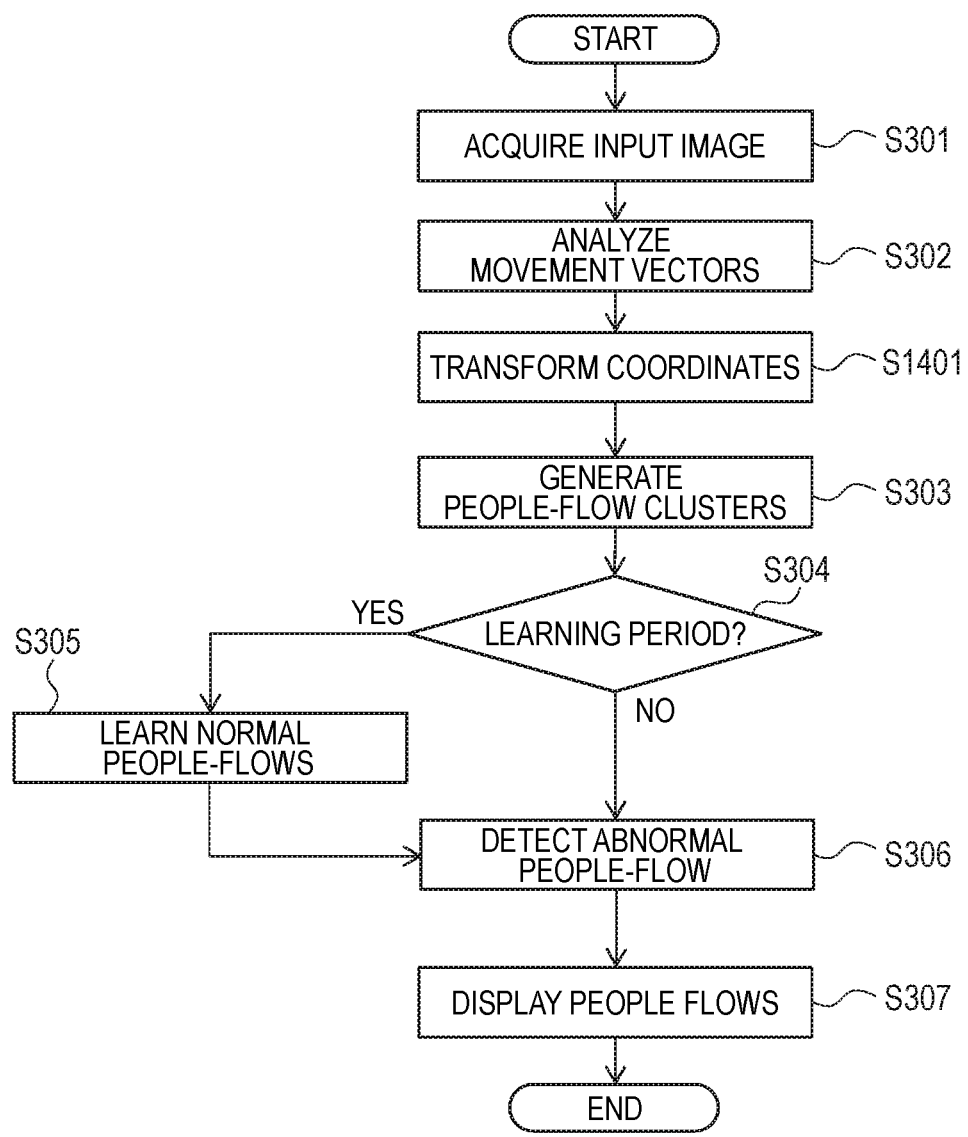
FIG. 14 is a flowchart illustrating exemplary information processing by the image processing apparatus.

FIG. 14 is a flowchart illustrating exemplary information processing by the image processing apparatus 1300. The flowchart in FIG. 14 has step S1401 further added to the flowchart in FIG. 3.

Figure 15:
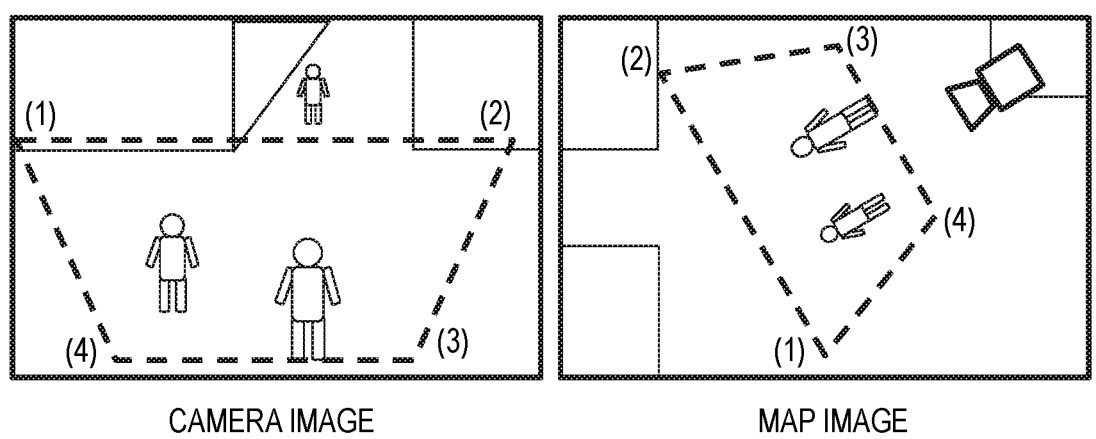
FIG. 15 is a diagram illustrating exemplary matched points in coordinate transformation.

At step S1401, the coordinate transformation unit 1301 performs processing of transforming detected coordinates in a camera image into detected coordinates on a map. A way of transforming the coordinates is projective transformation based on matched points. As illustrated in FIG. 15, the coordinate transformation unit 1301 allows a user to specify arbitrary four points in the camera image and arbitrary four points on the map. This enables a projective transformation formula to be derived so that any point in the camera image can be mapped to a corresponding position on the map. When the matched points are specified, a constraint may be imposed on the order of specifying the points to avoid wrong matching. For example, the order may be constrained to be "clockwise from the upper-left point." It is also effective that the coordinate transformation unit 1301 indicates, in numbers, the order in which the points are specified, as illustrated in FIG. 15. Given specified coordinate points and their order, the coordinate transformation unit 1301 can determine whether the coordinate points were input according to the predetermined constraint. Therefore, if the constraint is violated, the coordinate transformation unit 1301 provides setting failure notification and prompts the user to input again. If multiple cameras are provided, the coordinate transformation unit 1301 matches all cameras with the map.

Figure 16:
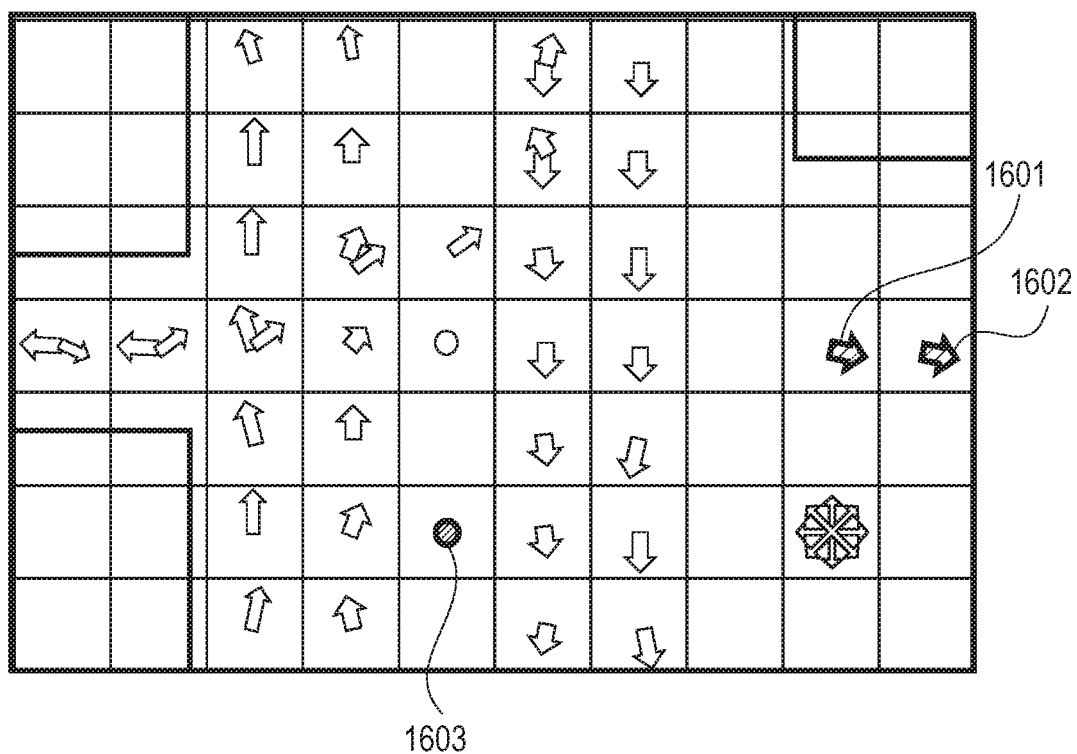
FIG. 16 is a diagram illustrating an example of displaying normal people-flows and abnormal people-flows in a visually distinguishable manner.

As a result of the coordinate transformation unit 1301 performing the coordinate transformation processing, the movement vectors extracted at step S302 can be transformed into coordinates on the map. Once the processing starting at step S303 is all performed based on the coordinates on the map, the display unit 206 can display people-flow clusters superimposed on the map as in FIG. 16. In FIG. 16, icons 1601, 1602 and 1603 represent abnormal people-flow clusters, while other icons represent normal people-flow clusters.

Third Embodiment

This embodiment describes a case when notification of information about an abnormal people-flow is provided on the occurrence of the abnormal people-flow. In this embodiment, differences from the first embodiment will be described. Otherwise, the description will be omitted. By the CPU 10 performing processing based on programs stored in the memory 11, the functional configuration of an image processing apparatus 1700 in FIG. 17 (to be described below) and the process of a flowchart in FIG. 18 (to be described below) are implemented.

Figure 17:
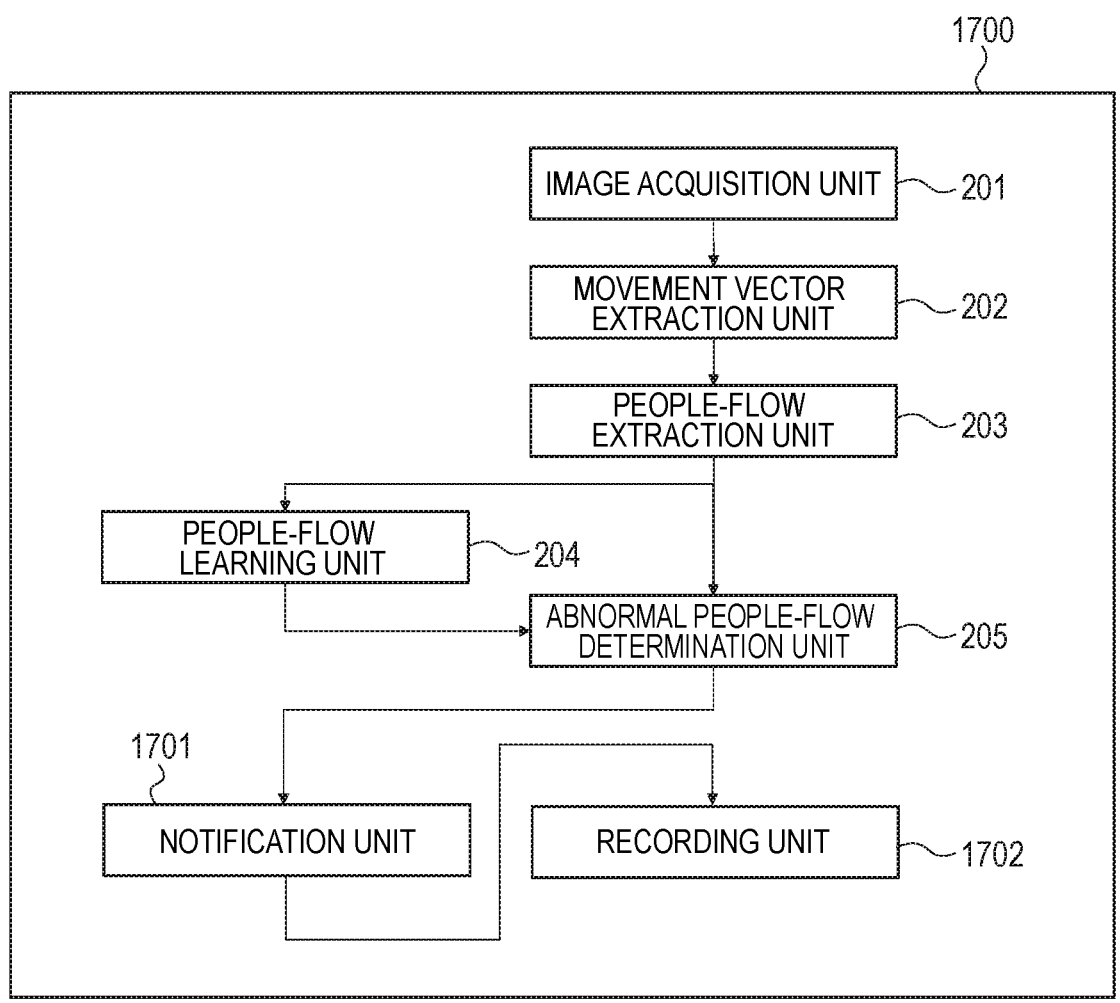
FIG. 17 is a diagram illustrating an exemplary functional configuration of an image processing apparatus.

FIG. 17 is a diagram illustrating an exemplary functional configuration of the image processing apparatus 1700. FIG. 17 has the display unit 206 removed from and a notification unit 1701 and a recording unit 1702 further added to the image processing apparatus 100 in FIG. 2. The notification unit 1701 performs processing of providing notification of information about an abnormal people-flow to an external entity via the network I/F 12 when the occurrence of the abnormal people-flow is determined by the abnormal people-flow determination unit 205. The recording unit 1702 stores, in the memory 11, information about the people-flow clusters extracted by the people-flow extraction unit 203.

Figure 18:
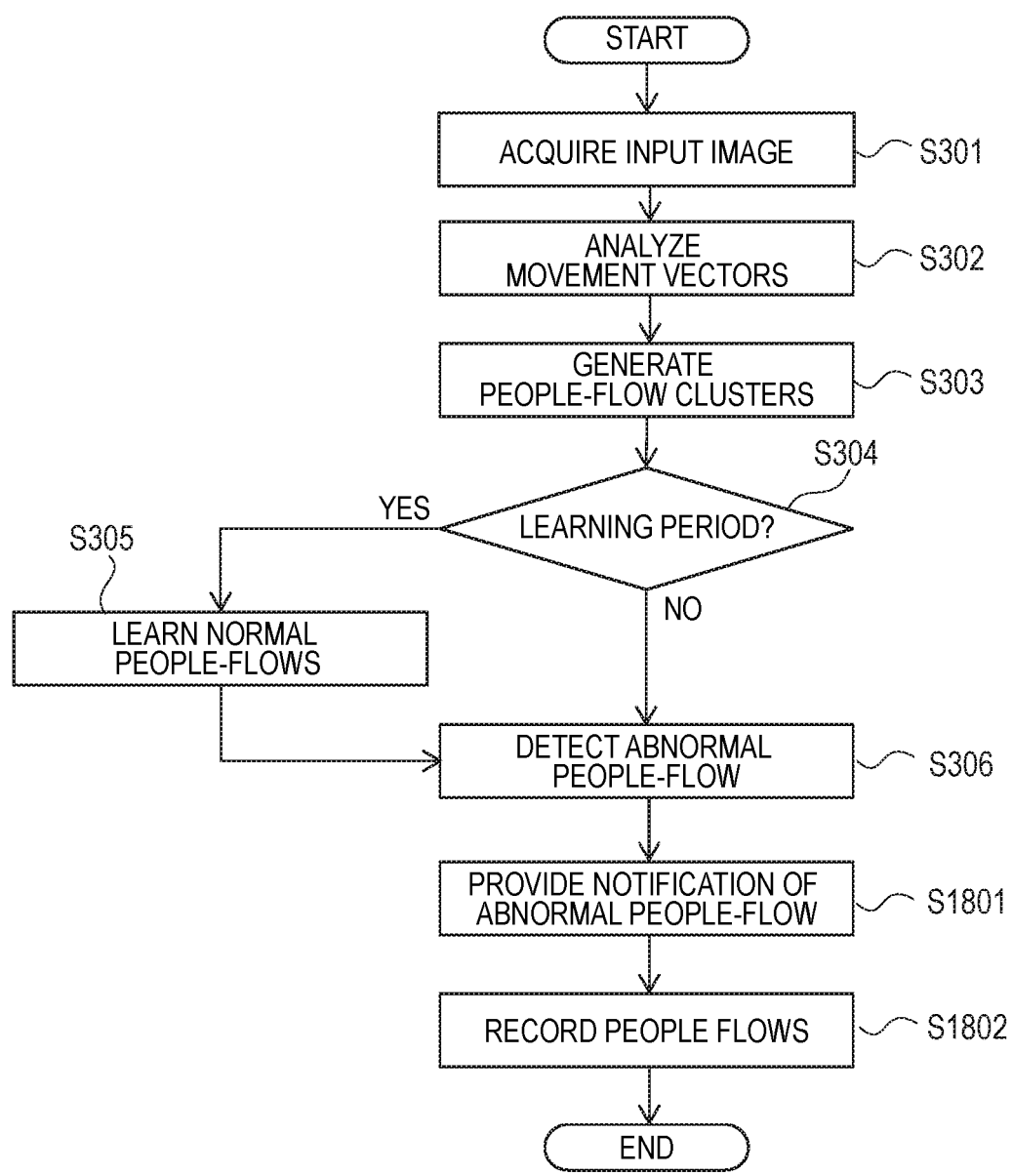
FIG. 18 is a flowchart illustrating exemplary information processing by the image processing apparatus.

FIG. 18 is a flowchart illustrating exemplary information processing by the image processing apparatus 1700. FIG. 18 has step S307 removed from and steps S1801 and S1802 further added to the flowchart in FIG. 3.

At step S1801, on the occurrence of a people-flow cluster determined as abnormal by the abnormal people-flow determination unit 205, the notification unit 1701 performs processing of providing notification of information about the abnormal people-flow cluster to an external entity via the network I/F 12. The information about an abnormal people-flow cluster includes at least one of: the position on the screen or map where the abnormal people-flow cluster occurred, the number of people constituting the people-flow cluster, the moving direction of the people-flow cluster, and the moving speed of the people-flow cluster.

Providing notification on the occurrence of an abnormal people-flow enables taking actions, such as immediately notifying a security staff of the occurrence of an abnormal situation or recording and storing video at the time of occurrence of the abnormal situation.

At step S1802, the recording unit 1702 stores, in the memory 11, information about the people-flow clusters extracted by the people-flow extraction unit 203. The information about each people-flow cluster includes at least one of: the position on the screen or map where the people-flow cluster occurred, the time of the occurrence of the people-flow cluster, whether the people-flow cluster is normal or abnormal (or the degree of abnormality), the number of people constituting the people-flow cluster, the moving direction of the people-flow cluster, and the moving speed of the people-flow cluster. Alternatively, the recording unit 1702 may store only information about people-flow clusters determined as abnormal by the abnormal people-flow determination unit 205. Storing the information about the people-flow clusters enables, e.g., subsequently searching the video only for scenes containing the occurrence of abnormal people-flows.

While the exemplary embodiments of the present invention have been described in detail above, the present invention is not limited to these specific embodiments.

For example, in the hardware configuration of the image processing apparatus 100, the CPU may be replaced with a GPU (Graphics Processing Unit).

Also, part or all of the functional configuration of the image processing apparatus 100 may be implemented in the hardware configuration of the image processing apparatus 100.

The above-described embodiments may also be implemented in any combination.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
    an acquisition unit configured to acquire a movement vector in a partial area of an image, the movement vector indicating a movement of a person detected from the image;
    a generation unit configured to generate a cluster of movement for which a previously stored probability of occurrence of predetermined movement in the partial area is less than a predetermined threshold, based on a frequency of the acquired movement vector; and
    an output unit configured to output information indicating that the generated cluster is abnormal.

2. The image processing apparatus according to claim 1, wherein the generation unit is configured to generate a directed cluster from people moving in the same direction based on the movement vectors acquired by the acquisition unit, and
    the output unit is configured to display, in a visually distinguishable manner, the directed cluster as superimposed on the image.

3. The image processing apparatus according to claim 1, wherein
    the generation unit is configured to generate a stagnant cluster from people stagnating at the same location based on the movement vectors acquired by the acquisition unit, and
    the output unit is configured to display, in a visually distinguishable manner, the stagnant cluster as superimposed on the image.

4. The image processing apparatus according to claim 1, wherein the generation unit is configured to generate a random cluster from people moving in random directions based on the movement vectors acquired by the acquisition unit, and
    the output unit is configured to display, in a visually distinguishable manner, the random cluster as superimposed on the image.

5. The image processing apparatus according to claim 1, wherein the generation unit is configured to acquire the number of people constituting the cluster, and
    the output unit is configured to display the number of people for the cluster.

6. The image processing apparatus according to claim 1, wherein the generation unit is configured to acquire a speed of the cluster, and
    the output unit is configured to display the speed for the cluster.

7. The image processing apparatus according to claim 1, wherein the generation unit is configured to acquire a direction of the cluster, and
    the output unit is configured to display the direction for the cluster.

8. The image processing apparatus according to claim 1, wherein the acquisition unit is configured to acquire the movement vectors of the person by performing human body detection for each of a pair of temporally sequential image frames and performing human body tracking to match detected human bodies.

9. The image processing apparatus according to claim 1, wherein the acquisition unit is configured to acquire the movement vectors of the person by using an estimator that takes an area of temporally sequential image frames as an input and estimates a crowd density distribution and a movement vector distribution.

10. The image processing apparatus according to claim 1, further comprising a transformation unit configured to map the movement vectors acquired by the acquisition unit on a map by transforming coordinates in the image into coordinates on the map, wherein the generation unit is configured to generate the clusters for each area of the map based on the movement vectors mapped on the map, and the output unit is configured to display the generated clusters as superimposed for each area of the map.

11. The image processing apparatus according to claim 1, wherein the output unit is configured to provide notification of information about the abnormal cluster.

12. The image processing apparatus according to claim 1, further comprising a storage unit configured to store information about the clusters generated by the generation unit.

13. The image processing apparatus according to claim 1, wherein the generation unit is configured to generate a cluster of predetermined movement in which an abnormality degree acquired based on the previously stored probability of occurrence of predetermined movement in the partial area is great.

14. The image processing apparatus according to claim 1, wherein the generation unit is configured to generate the cluster of movement in which the previously stored probability of occurrence of predetermined movement in the partial area is less than the predetermined threshold, among clusters of movement, in which the frequency of the acquired movement vector is greater than a predetermined frequency.

15. A method of image processing, the method comprising:

acquiring a movement vector in a partial area of an image, the movement vector indicating a movement of a person detected from the image;

generating a cluster of movement for which a previously stored probability of occurrence of predetermined movement in the partial area is less than a predetermined threshold, based on a frequency of the acquired movement vector; and outputting information indicating that the generated cluster is abnormal.

16. A non-transitory computer-readable recording medium having stored thereon a program for causing a computer to function, in an image processing apparatus, as:

an acquisition unit configured to acquire a movement vector in a partial area of an image, the movement vector indicating a movement of a person detected from the image;

a generation unit configured to generate a cluster of movement for which a previously stored probability of occurrence of predetermined movement in the partial area is less than a predetermined threshold, based on a frequency of the acquired movement vector; and an output unit configured to output information indicating that the generated cluster is abnormal.

17. An image processing apparatus comprising:

an acquisition unit configured to acquire one or more movement vectors of an image, the movement vector indicating a movement of a person detected from the image;

a generation unit configured to generate one or more clusters respectively for directions of the movement vectors;

a detection unit configured to detect a cluster for which a stored probability of occurrence is less than a threshold among the one or more generated clusters; and an output unit configured to output information indicating that the detected cluster is abnormal.

18. The image processing apparatus according to claim 17, wherein the acquisition unit is configured to acquire the movement vector corresponding to one or more partial areas of the image.

19. The image processing apparatus according to claim 17, wherein the detection unit is configured to detect, as a normal cluster, a cluster for which a stored probability of occurrence is greater than the threshold among the generated clusters, and the output unit is configured to output, in a visually distinguishable manner, the normal cluster and the abnormal cluster.

20. The image processing apparatus according to claim 17, wherein the output unit is configured to output information indicating a random cluster if the movement vectors appear to be substantially uniform in all directions.

21. A method of image processing, the method comprising:

acquiring one or more movement vectors of an image, the movement vector indicating a movement of a person detected from the image;

generating one or more clusters respectively for directions of the movement vectors;

detecting a cluster for which a stored probability of occurrence is less than a threshold among the one or more generated clusters; and outputting information indicating that the detected cluster is abnormal.

22. A non-transitory computer-readable recording medium having stored thereon a program for causing a computer to function; in an image processing apparatus, as:

an acquisition unit configured to acquire one or more movement vectors of an image, the movement vector indicating a movement of a person detected from the image;

a generation unit configured to generate one or more clusters respectively for directions of the movement vectors;

a detection unit configured to detect a cluster for which stored a probability of occurrence is less than a threshold among the one or more generated clusters; and an output unit configured to output information indicating that the detected cluster is abnormal.

* * * * *